United States Patent

[11] 3,600,681

[72] Inventor Timothy Arbuckle
Montclair, N.J.

[21] Appl. No. 881,964
[22] Filed Dec. 4, 1969
[45] Patented Aug. 17, 1971
[73] Assignee Computer Modern Corporation
Fort Lee, N.J.

[54] NONLINEAR EQUILIZATION SYSTEM INCLUDING SELF- AND CROSS-MULTIPLICATION OF SAMPLED SIGNALS
6 Claims, 4 Drawing Figs.

[52] U.S. Cl. .......... 325/42, 325/65, 325/324, 328/155, 333/18
[51] Int. Cl. .......... H04b 1/12, H04b 3/04
[50] Field of Search .......... 325/41, 42, 65, 323, 324; 333/17, 18, 28, 70 T; 328/155, 162

[56] References Cited

UNITED STATES PATENTS

| | | | |
|---|---|---|---|
| 3,403,340 | 9/1968 | Becker et al. .......... | 325/65 |
| 3,479,458 | 11/1969 | Lord et al. .......... | 325/42 |
| 3,508,172 | 4/1970 | Kretzmer et al. .......... | 333/28 |
| 3,524,169 | 8/1970 | McAuliffe et al. .......... | 333/18 |

*Primary Examiner*—Robert L. Griffin
*Assistant Examiner*—James A. Brodsky
*Attorney*—Watson, Leavenworth and Kelton

ABSTRACT: A communication channel equalization system having capacity for compensatingly modifying received signals for first and higher order communication channel disturbances respectively inducing linear and nonlinear distortion in received signals. The system includes means providing self-multiplication and cross-multiplication of samplings of received signals, and means for selective attenuation control of such multiplied samplings.

NONLINEAR EQUILIZATION SYSTEM INCLUDING SELF- AND CROSS-MULTIPLICATION OF SAMPLED SIGNALS

This invention relates to communication channel equalization systems and more particularly to an equalization system for compensation of both linear and nonlinear distortions induced in signals transmitted by the channel.

In the high-speed transmission of digital signals over communication channels such as conventional voice-grade telephone lines, it has become customary to idealize the linear transmission characteristics of the channel by selective modification of characteristics of signals operated upon by and received from the channel. This channel idealization or equalization is generally effected by compensatingly distorting signals transmitted by the channel in such manner as to bring about substantial identity between the amplitude versus time characteristics of received signals and corresponding signals applied to the channel at the transmitting station. For this purpose, the receiving station includes an equalization system operative to process signals derived from the channel to detect therefrom deviations in linear channel transmission characteristics, e.g. phase and amplitude frequency responses of the channel, and to compensatingly modify the signal amplitude versus time characteristic accordingly. Systems performing this signal characteristic modification have the evident effect of improving channel transmission efficiency, measured by the number of bits of intelligible information transmitted by the channel per unit time, by minimizing repeated transmission of information so distorted by the channel as not to be intelligible and by reducing error-correction time.

Presently known equalization systems generally employ first apparatus operating directly upon received signals to perform the signal characteristic modification and second apparatus for directing operation of the first apparatus. The first apparatus, referred to as the system equalizer, generally has taken the form of a transversal filter having a delay line, to which the received signal is applied, comprising a plurality of equal delay elements serially connected, individual taps being provided at delay element junctions, each tap incorporating a variably settable attenuator. The attenuator outputs are applied to a summing device, the output of which has amplitude versus time character determined by tap settings. The attenuator taps are controllably set by said second apparatus, referred to as the equalizer controller, and the received signal is thereby modified to an extent indicating suitable channel equalization when difference comparison in the second apparatus of the summing device output signal and a reference signal results in the generation of second apparatus output signals or equalizer control signals directing no further adjustment of the attenuator taps.

Various arrangements are known for use in the equalizer controller for generation of said reference signal. In one known method, the reference signal is stored in both the receiving and transmitting stations and, during the course of an alignment or training period, the signal is applied to the channel for transmission thereover. Received versions of the signal are then compared with the receiver stored reference for generation of the equalizer control signal.

In such nonadaptive equalization systems, the communication channel is equalized during the alignment period by appropriate setting of the attenuator taps to provide accordance between the received signal and the test pattern. The attenuator taps are then locked into position and remain so set during all subsequent information exchange. Since departures of channel phase and amplitude frequency responses are of relatively low order over extended time periods, a system of this type may be employed with periodic updated equalization. A typical nonadaptive equalization system is disclosed in U.S. Pat. No. 3,393,110 to F. K. Becker et al.

In applications demanding higher transmission efficiencies, adaptive equalization is provided by systems which continuously derive equalizer control signals from transmitted information-containing signals. In this situation, the receiver generates the reference signal dependently and corrections for deviations of channel phase and amplitude frequency response are made periodically as required during continuing transmission. One form of this adaptive equalization system is disclosed in copending application Ser. No. 819,362 filed on Apr. 25, 1969, entitled "Communication Channel Equalization System and Equalizer," assigned to the present assignee.

Presently known equalization systems of both the adaptive and nonadaptive varieties are limited in functional capacity to the detection and correction of first order disturbances in applied signals, and provide compensation solely for deviations in linear transmission characteristics of the communication channel, such as said deviations in phase and amplitude frequency response. As such, these systems are linear equalization systems and are ineffective to equalize for communication channel nonlinearities. Thus, despite particular care in these systems in the selection of an ideal number of delay sections and attenuator taps on the basis of close frequency spectrum analysis of information being transmitted by the channel, these systems are not cognizant of communication channel nonlinearities and are incapable of compensation of such higher order discrepancies. Thus, where the transmission system incorporates amplifiers, modulators, demodulators and like channel accessory components subject to nonlinear operation, presently known equalization systems do not have equalizing capabilities adapted to improve transmission efficiency to the extent that it is limited by nonlinearities in these components.

It is an object of the present invention to provide a communication channel equalization system having improved functional capacity.

It is a further object of the present invention to provide a system for equalization of both linear and nonlinear communication channel transmission characteristics.

It is an additional object of the present invention to provide a communication channel equalizer having higher order equalization cognizance and correction means.

In the present invention an equalization system is provided wherein cognizance is taken of linear and higher order deviations of the communication channel transmission characteristics, as same are expressed in distortions of transmitted information. The system may be of either the adaptive or nonadaptive type and includes means effective to compensatingly distort received signals for distortion induced therein by deviation of linear channel characteristics, such as irregularities in phase and amplitude frequency response, and also by nonlinear channel characteristics attributable to accessory amplifiers, modulators, and like components, or to transmitted information pattern distribution, e.g. intersymbol influence.

In brief summary of the invention, equalizer apparatus is provided comprising a transversal filter incorporating a tapped delay line, a cross-multiplier providing discrete output signals constituting the self- and cross-products of all signals provided at the delay line taps, a plurality of adjustable attenuators each receiving one of said cross-multiplier output signals, each said attenuator incorporating a tap adapted for adjustment by an equalization controller, and a summation device receiving all cross-multiplier output signals amplitude-limited by said attenuators and providing an output signal constituting the requisitely modified version of received signals applied to the delay line. The equalization controller incorporates first means generating a reference signal, second means differencing said reference signal and said summation device output signal and third means performing correlation of said cross-multiplier output signals and said difference signal for generation of attenuator adjustment control signals.

The above and other objects and features of the invention will be evident from the following detailed description of preferred embodiments thereof and from the accompanying drawings wherein like numerals represent like parts throughout.

Figure 1:
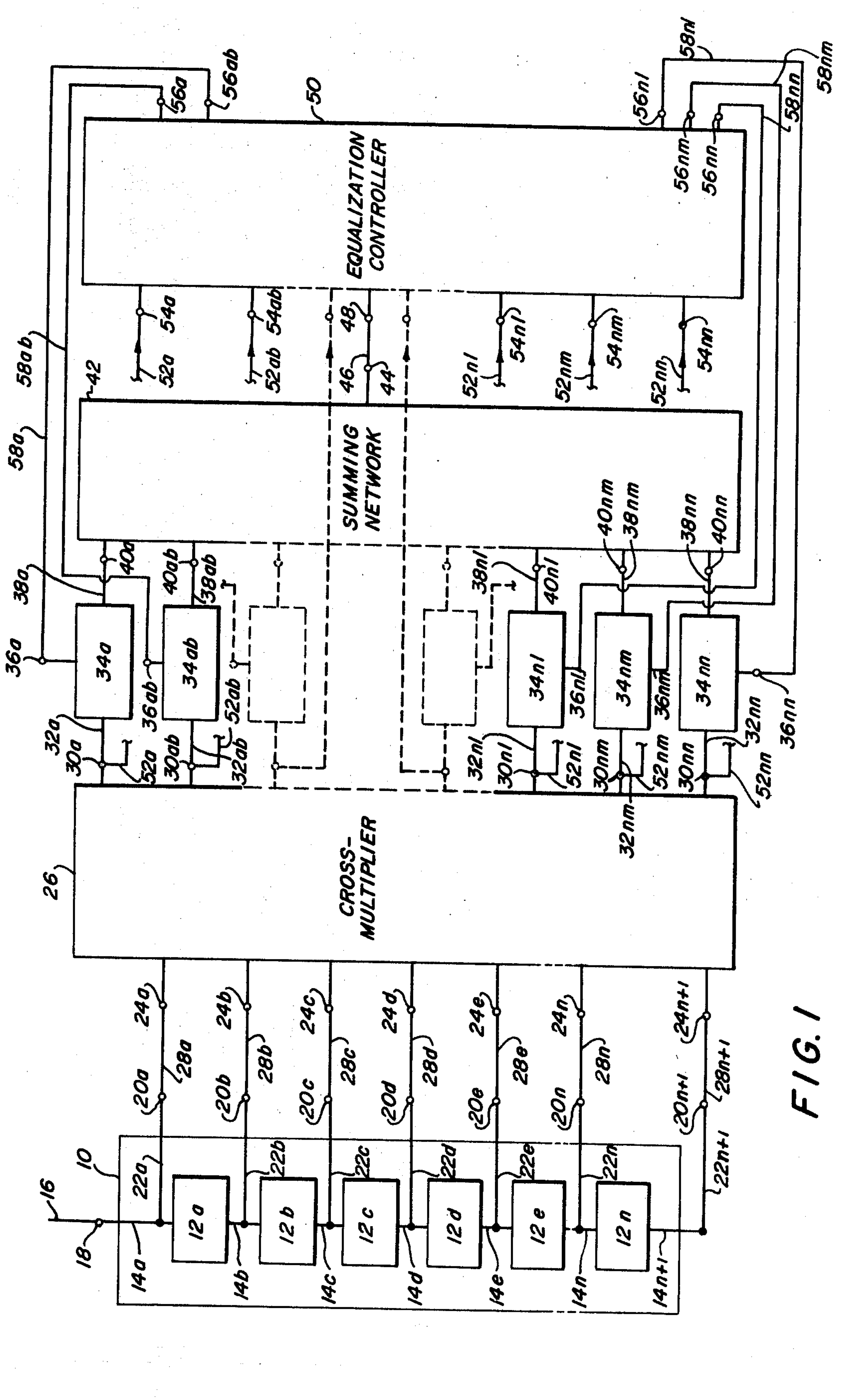
FIG. 1 is a block diagrammatic illustration of an equalizer and an equalization system constructed in accordance with the invention.

Referring to FIG. 1, the equalizer of the invention includes the typical equalizer delay line 10 constituted by a plurality of equal delay elements 12*a*, 12*b* . . . 12*n* serially connected by lines 14*a*, 14*b* . . . 14*n*+1. A received signal to be equalized is applied over line 16 to input terminal 18 of delay line 10 and is thence applied over line 14*a* to the first serial delay element 12*a*. The delay line has output terminals 20*a*, 20*b* . . . 20*n*+1 which are connected by lines 22*a*, 22*b* . . . 22*n*+1 to delay line connecting lines 14*a*, 14*b* . . . 14*n*+1. The delay line may be constituted of any desired number of individual delay elements. The delay line output terminals 20*a*, 20*b* . . . 20*n*+1 are connected to the input terminals 24*a*, 24*b*. . . 24*n*+1 of a cross-multiplier 26 over lines 28*a*, 28*b* . . . 28*n*+1.

Figure 2:
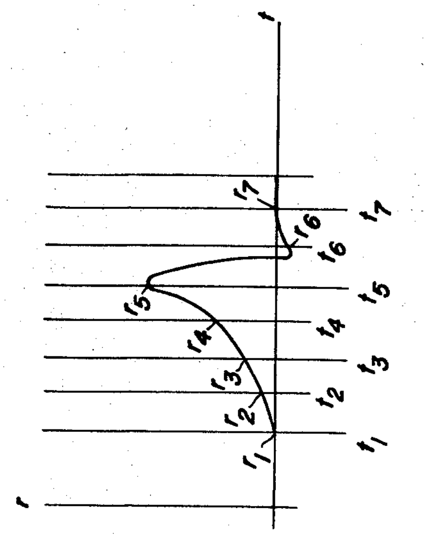
FIG. 2 is a graphical illustration of a typical pulse applied to the equalization system of FIG. 1 bearing indications of pulse sampling times.

Referring to FIG. 2 a typical pulse requiring equalization is amplitude-sampled at times $t_1$ through $t_7$ by delay line 10 by appropriate selection of the time delays provided by delay elements 12*a*, 12*b* . . . 12*n*. The sampling time periods may be equally spaced about the center $t_4$ of the pulse by selecting each delay element 12 of time delay equivalent to the equal incremental sample periods, i.e. $t_4$ $t_3$. The amplitudes of the pulse of FIG. 2 at the various sampling times are indicated by the designations $r_1$ through $r_7$, the sampling amplitude at time $t_4$ being $r_4$. In the illustrated six-element delay line the sampling amplitude $r_4$ will be provided by the delay line at output terminal 20*d*. Similarly, the sampling amplitudes $r_1$ through $r_3$ will be provided at delay line output terminals 20*a*, 20*b* and 20*c* and the sampling amplitudes $r_5$ through $r_7$ will be provided at delay line 10 output terminals 20*e*, 20*n* and 20*n*+1. For these sampling conditions to exist, the exemplary pulse of FIG. 2 is of period equal to that of the delay line and is sampled at the instant of time when the leading edge thereof has immediately traversed delay line element 12*n* and the trailing edge thereof has immediately entered delay element 12*a*. Appropriate sampling time control means may be provided for this purpose. Evidently there is no requirement that the delay line and sampled signal period be identical.

Cross-multiplier 26 is of conventional structure, well known apart from its presently disclosed application, such as a plurality of Hall-effect multipliers and is adapted to generate output signals constituting all possible products of input signals, inclusive of cross-products of all input signals, and self-products of input signals, i.e. squares and higher order functions thereof. These product signals are provided by the cross-multiplier at output terminals 30*a* through 30*nn*. By way of example, the signal provided at terminal 30*a* is comprised of the product $r_8r_8$, the product on line 32*ab* being $r_8r_7$ etc. The cross-multiplier output signals are respectively applied over lines 32*a* through 32*nn* to variable attenuators 34*a* through 34*nn*. Attenuators 34 receive tap-setting control signals at input terminals 36*a* through 36*nn* and provide accordingly attenuated product signals on output lines 38*a* through 38*nn*. These signals are applied to the input terminals 40*a* through 40*nn* of summing network 42. This unit generates at output terminal 44 thereof output signals of amplitude versus time composition defined by the time series of said attenuated input signals applied thereto. Such output signals, modified versions of signals applied to equalizer input terminal 18 for compensating distortion, i.e. compensated received signals, are conducted over line 46 to input terminal 48 of equalizer controller 50.

Figure 3:
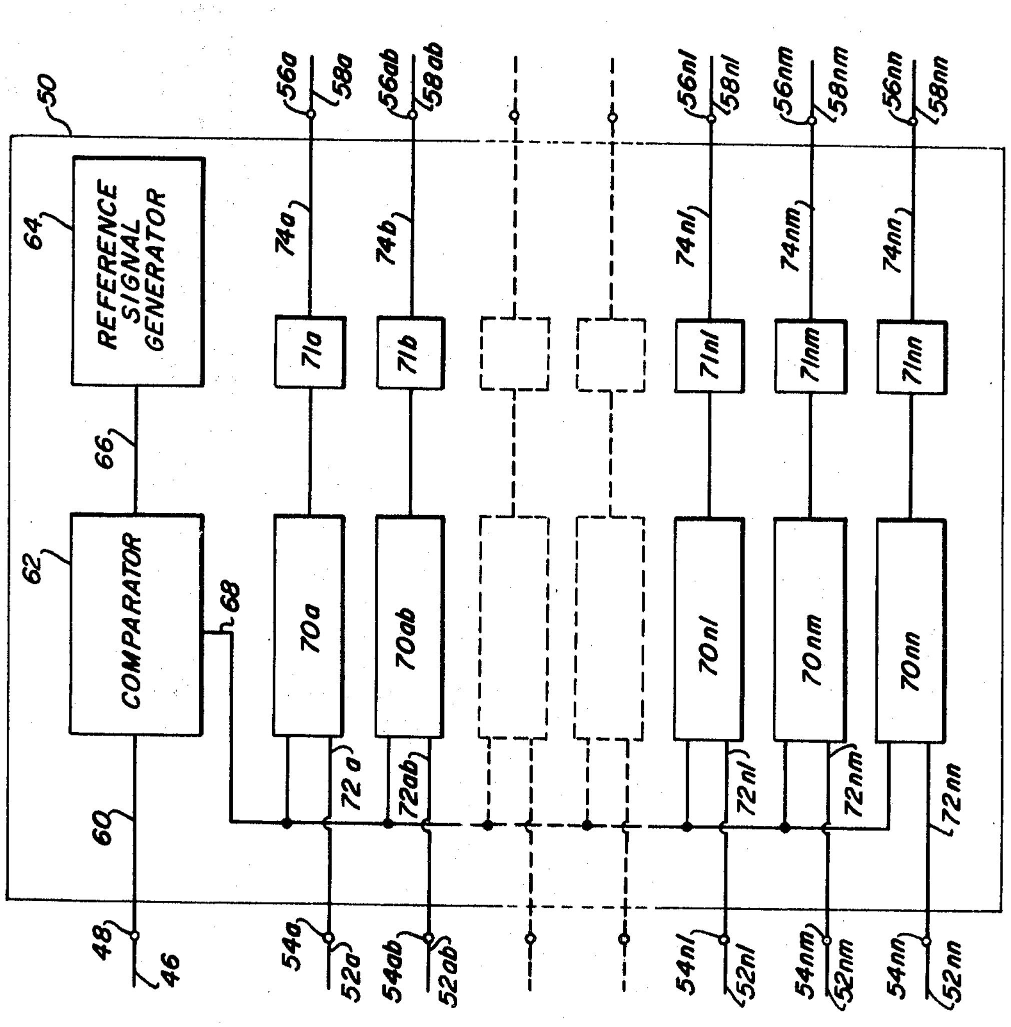
FIG. 3 is a block diagrammatic illustration of a preferred embodiment of the equalizer controller for use in the equalization system of FIG. 1.

Equalizer controller 50 may be of the configuration illustrated in FIG. 3 as will be discussed below. The controller is adapted to perform a comparison of the signal applied thereto at input terminal 48 and an internally generated reference signal. The error resulting from such comparison is correlated with all input signals applied from lines 52*a* through 52*nn* to input terminals 54*a* through 54*nn* of the controller, these signals constituting all of the cross-multiplication products generated by cross-multiplier 26. In accordance with each correlation, controller 50 generates at output terminals 56*a* through 56*nn* an output signal for control of the attenuator associated with the particular cross-product correlated with the error signal, said output terminals being connected by lines 58*a* through 58*nn* to the attenuator control terminals 36*a* through 36*nn*.

In contrast to the prior art equalizers discussed above and capable only of equalizing a communication channel for first order or linear transmission characteristics thereof, the equalizer of FIG. 1 includes the capacity for compensating those distortions induced in received signals by second order or nonlinear characteristics of the communication channel. This capacity is provided by the incorporation of cross-multiplier 26, by the inclusion of additional attenuators beyond those normally provided in known equalizers, and by deriving attenuator sampling input signals from the cross multiplier in contrast to the prior art derivation of such signals directly from the tapped delay line. Summing network 42 is accordingly expanded in its summing capacity to accommodate the signals provided by the increased attenuators of the system.

The equalization capacity of the system of FIG. 1 will be further clarified by brief reference to the mathematical operations undertaken in the prior art first order equalization system and the present first and higher order equalization system. All types of equalization systems are required to evaluate the convolution integral which results from the convolving of transmitted information and channel transmission characteristics. Upon evaluating this convolution integral, all types of equalization systems provide signals indicative of the coefficients of the terms of a series of terms descriptive of the integral. In prior art equalization systems, these coefficients are orthogonal and linear, i.e. they identify the quantitative or scaler value of all first order terms of the integral. In the prior art systems, these coefficients are directly assigned to the attenuators serially connected with each of the multiple taps of the delay line to which the signal to be equalized is applied. Since only first order terms are quantized, and since these terms are thereafter applied directly to a summation device for generation of the equalized signal, there is no functional capacity in the prior art equalization system for cognizance of other terms. Whereas the equalization system may be said to have as its function the quadratic nonlinear filtering of transmitted signals to compensate same for channel induced distortions, the prior art equalizer performs only a linear filtering operation.

In contrast, the equalization system of FIG. 1 evaluates the convolution integral to the extent required to generate electrical signals indicative of the coefficients of first order, higher order and cross-product terms of the convolution integral. Thus, both orthogonal and nonorthogonal tap coefficients are developed. These tap coefficients are applied to an expanded number of attenuators for control thereof, said attenuators being series-connected not with the orthogonal delay line outputs of the prior art equalizer, but with the output terminals of the cross-multiplier. Summation of the first and higher order signals as well as the cross produce signals provides a considerably expanded evaluation of the convolution integral and permits generation by the summing device of an output signal, the amplitude versus time characteristic of which is comprised of all said time-spaced terms. The summing device output signal is compensatingly distortable by attenuator tap setting to a degree permitting equalization of the communication channel in respect of both first and higher or linear and nonlinear deviations of the transmission characteristic.

To generate the attenuator tap-controlling signals, provided to attenuators 34 over lines 58 in FIG. 1, correlation is required between each of the cross-multiplier output signals and the difference signal developed by comparison of the summing device output signal and a reference signal. The manner in which this correlation is accomplished will be seen by reference to FIG. 3 wherein a preferred form of the equalizer controller 50 of FIG. 1 is illustrated. The output signal of summation means 42 conducted to input terminal 48 of the controller is applied over line 60 to comparator 62. Reference signal generator 64 which may be of the adaptive or nonadaptive type, provides a reference signal to the comparator over line 66. The difference between the signals on lines 60 and 66 is provided by comparator 62 on output line 68, this error signal being of magnitude indicative of the extent of correction required in the signal provided on line 60, i.e. the extent of equalization required. Line 68 communicates said signal to a plurality of correlating circuits each of which receives over lines **72*a* through 72*nn* a selective one of the output signals of attenuators 34*a* through 34*nn*. The correlating circuits preferably include a Hall effect multiplier 70 and a series integrator 71. A signal indicative of the integrated product of the signals applied to each of the correlating circuits is generated at the respective output lines 74*a* through 74*nn* of the correlating circuits for application to the associated attenuator control terminals 36*a* through 36*nn*. As will be evident to those skilled in the art, only those correlating circuits whose input signals differ will generate output signals directing modification of the setting of their associated attenuators. For example, where there exists a second order nonlinearity in the signal of FIG. 2 at time $t_6$ not having correspondence in the idealized waveform generated by signal generator 64, the difference signal at line 68 will contain a second order term $r_2$ component, and the correlator receiving $r_2r_2$ cross-multiplier output signals and said difference signal will direct a change in coefficient value for the attenuator 34 corresponding to that second order term. Evidently, the correlating arrangement of FIG. 3** will be inclusive of correlators associated with the first order terms of the convolution integral as well as second order and cross-product terms and thus will provide both the equalization which would be provided by the prior art system as well as that of the exemplary type described above.

In its operation, the equalization controller provides attenuator tap control signals which serve, under a mean square error criterion implemented in the correlating circuits, to diminish the source of error contributed by each attenuator to the summing network 42 output signal, and hence to the difference signal generated by comparator 62. The attenuators may be comprised of variably settable resistive networks and associated circuitry operatively responsive to polarity and magnitude of applied control signals to precisely scale the sampling signal or sampling product signal derived from the cross-multiplier.

As mentioned previously, the equalizer and equalization system of the invention may be developed in conjunction with a nonadaptive or adaptive equalization controller. Referring to FIG. 3 this characteristic of the equalization controller is determined solely by operation of reference signal generator 64. In nonadaptive application this unit includes means operative upon demand for generating a test pattern for employment during a training or alignment period. The test pattern, preferably comprised of an interspersed plurality of digital ONES or ZEROS, is also generated in the transmitting station and applied to the transmission medium. After several cycles of transmission, comparison in circuit 62 and correlation in circuits **70*a*—*71a* through 70*nn*—*71nn* will direct attenuators 34*a* through 34*nn*** to be set to the appropriate coefficient values underlying the evaluation of the convolution integral.

Figure 4:
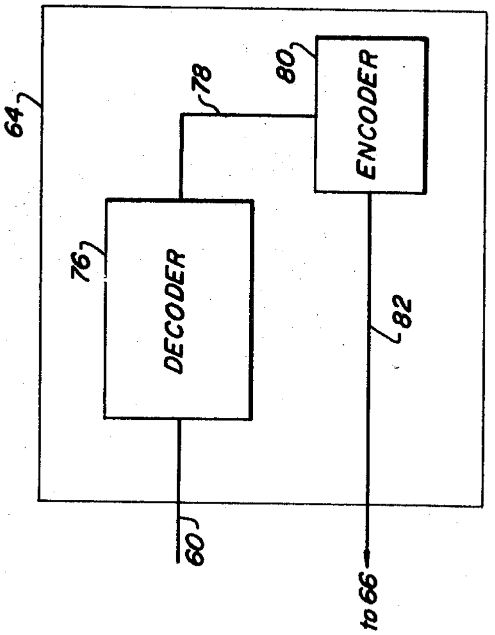
FIG. 4 is a block diagrammatic illustration of a reference signal generator employable in an adaptive equalization system constructed in accordance with the invention.

In adaptive application, reference signal generator 64 may take the structure illustrated in FIG. 4 in which case the attenuator tap control signals are repeatedly generated during transmission. Referring to FIG. 4, a preferred structure for the referenced signal generation, adapted for use in conjunction with error correction encoded digital data signals, comprises a decoder 76 to which the summation device output signal on line 60 is applied. Decoder 76 has stored therein the error correction code employed in the transmission system with which the equalization system is employed. In response to line 60 signals the decoder generates at output line 78 information signals, i.e. transmitted signals from which error correction bits have been extracted. This operation is of course typical in digital data transmission system receivers and decoder 76 includes the further capacity of correcting said information signals by detecting errors therein from a conjunctive consideration of the particular information pattern and the particular correction pattern. In similar connection, encoding of information is performed at the transmitting station by associating error control bits with information bits such that nominal correction may be made to information erroneously received and retransmission thereof may be avoided.

The error corrected information signals provided at line 78 are applied to an encoder 80 which also has stored therein the system error correction code. Encoder 80 is also a typical transmission system component normally employed in said transmitting station error-correction encoding. In the FIG. 4 arrangement, the encoder provides at output line 82 error correction encoded information which has precisely the same amplitude versus time characteristics as the signal applied to the transmission medium by the transmitting station. The apparatus of FIG. 4 is thus adapted to generate on a continuing basis a reference signal of ideal amplitude versus time composition desired in the signal applied to comparator 62 of FIG. 3 on line 66.

While the invention has been disclosed by way of the several foregoing particular embodiments thereof, it will be evident that various changes and modifications may be introduced therein by those with ordinary skill in the art to which the invention pertains. The foregoing disclosure is thus intended in a descriptive and not in a limiting sense. The full scope of the invention will be evident from the following claims.

What is claimed is:

1. A system for modifying the amplitude versus time characteristic of a signal received from a communication channel to compensate same for distortions induced therein attributable to first or higher order disturbances in the transmission characteristic of said channel comprising:

a. means providing a plurality of sampling signals indicative of the amplitudes of said received signal at different times during the period thereof;

b. means providing product signals indicative of self-multiplications of ones of said sampling signals, and cross-multiplications of twos of said sampling signals;

c. a plurality of attenuators, each receiving one of said product signals and increasing or decreasing the amplitude thereof in accordance with a control signal;

d. means combining said attenuator output signals and thereby providing said compensated received signal;

e. means generating a reference signal indicative of the amplitude versus time characteristic of said received signal prior to transmission thereof over said channel;

f. comparator means receiving said compensated received signal and said reference signal and generating a signal indicative of the amplitude difference therebetween; and g. means receiving said difference signal and said product signals and respectively cross-correlating each product signal and said difference signal for generating said control signal for each said attenuator.

2. The system claimed in claim 1 wherein said cross-correlating means comprises a plurality of signal multipliers each receiving one of said product signals and said difference signal and an integrator in series circuit with each said multiplier, said integrators generating said control signals.

3. The system claimed in claim 1 wherein said means providing said sampling signals includes a delay line having a plurality of taps, each tap providing one said sampling signal.

4. The system claimed in claim 1 wherein said received signal is error-correction encoded, said reference signal generating means comprising an error-correction decoder receiving said compensated received signal and regenerating same in error-corrected form, and an error-correction encoder receiving said error-corrected received signal and further regenerating same in error-correction encoded form.

5. Apparatus responsive to means providing equalization control signals for equalizing a communication channel by compensatingly modifying a signal received therefrom comprising:

a. means providing a plurality of sampling signals indicative of the amplitudes of said received signal at different times during the period thereof;

b. means providing product signals indicative of self-multiplications of ones of said sampling signals and cross-multiplications of twos of said sampling signals;

c. a plurality of attenuators, each receiving one of said product signals and increasing or decreasing the amplitude thereof in accordance with one of said equalization control signals; and d. means combining said attenuator output signals and providing said compensated received signal.

6. The apparatus claimed in claim 5 wherein said means providing said sampling signals includes a delay line having a plurality of taps, each tap providing one said sampling signal.